United States Patent
Johnson (10) Patent No.: US 8,299,347 B2
(45) Date of Patent: Oct. 30, 2012

(54) SYSTEM AND METHOD FOR A SIMPLIFIED MUSICAL INSTRUMENT

(76) Inventor: Gary Edward Johnson, San Jose, CA (US)

(*) Notice: Subject to any disclaimer, the term of this patent is extended or adjusted under 35 U.S.C. 154(b) by 106 days.

(21) Appl. No.: 12/784,854

(22) Filed: May 21, 2010

(65) Prior Publication Data

US 2011/0283869 A1  Nov. 24, 2011

(51) Int. Cl.
G10H 1/32 (2006.01)
G10H 1/06 (2006.01)
G10H 7/00 (2006.01)

(52) U.S. Cl. .......................... 84/718; 84/622
(58) Field of Classification Search ............ 84/622, 84/718–720
See application file for complete search history.

(56) References Cited

U.S. PATENT DOCUMENTS

| | | | |
|---|---|---|---|
| 5,627,335 A | 5/1997 | Rigopulos et al. | |
| 5,670,729 A | 9/1997 | Miller et al. | |
| 5,763,804 A | 6/1998 | Rigopulos et al. | |
| 5,808,221 A * | 9/1998 | Ashour et al. | 84/603 |
| 6,005,181 A | 12/1999 | Adams et al. | |
| 6,011,212 A | 1/2000 | Rigopulos et al. | |
| 6,388,183 B1 * | 5/2002 | Leh | 84/645 |
| 6,914,181 B2 * | 7/2005 | Toshitani | 84/645 |
| 7,320,643 B1 | 1/2008 | Brosius et al. | |
| 7,459,624 B2 | 12/2008 | Schmidt et al. | |
| 7,915,514 B1 * | 3/2011 | Shrem et al. | 84/645 |
| 7,973,232 B2 * | 7/2011 | Lengeling | 84/719 |
| 2002/0130844 A1 * | 9/2002 | Natoli | 345/168 |
| 2003/0159570 A1 * | 8/2003 | Toshitani | 84/645 |
| 2009/0258700 A1 * | 10/2009 | Bright et al. | 463/31 |
| 2009/0291756 A1 * | 11/2009 | McCauley et al. | 463/31 |
| 2011/0146479 A1 * | 6/2011 | Shrem et al. | 84/645 |
| 2011/0252949 A1 * | 10/2011 | Lengeling | 84/634 |

* cited by examiner

Primary Examiner — Jeffrey Donels
(74) Attorney, Agent, or Firm — Anderson & Levine, L.L.P.

(57) ABSTRACT

A system and method is described for a novel, simplified electronic musical instrument. By combining a simplified user input controller with a musical instrument synthesizer, a new simple to learn musical instrument is created allowing anyone to perform music without mastering the skills required to play traditional instruments. Traditional instruments require significant skills by users to even make sounds considered musical. The invention described herein allows any unskilled player to pick up the instrument and make music. Additionally, the user will be able to collaborate with others over the Internet, record, playback and edit their compositions, as well as publish the compositions.

16 Claims, 6 Drawing Sheets

SYSTEM AND METHOD FOR A SIMPLIFIED MUSICAL INSTRUMENT

FIELD OF THE INVENTION

This invention relates generally to electronic musical instruments, and more particularly to a simplified electronic music synthesizer controller, synthesizer and output device system.

BACKGROUND OF THE INVENTION

Electronic musical instruments created with keys, strings, and other input devices in conjunction with synthesizers for creating the musical sounds based on these inputs are well known and documented. These electronic musical instruments are typically very similar in form and function to traditional acoustic instruments which mean they require the same skills and nuances to generate music rather than just noise. Such electronic musical instruments, similar to traditional acoustic instruments, allow control of many parameters such as timbre, pitch and tone quality through slight user modifications to input controls.

For example, the main components of acoustic, electric and electronic guitars are strings and frets which are actuated by the user to generate notes and/or chords. Knobs or other controls are provided to control volume and tone. In order for the user to generate a correct note, they must have the appropriate finger placement pressing down the string or strings with the appropriate amount of pressure in the correct position above the fret. The user then uses the other hand to pluck or strum the string, generating the desired note. Similarly, chord, or combinations of notes, can be generated by using multiple fingers on multiple strings and frets with the appropriate amount of pressure and positioning applied, while the other hand strums or plucks the appropriate strings. If the user's fingering is off, either on the position above the fret or on the pressure of any of the strings on the frets, the wrong sound will be produced, creating noise. Simultaneously pressing the strings upon the frets and strumming can be awkward and difficult, making the experience less than musical and less than pleasant to the unskilled user. This stringed instrument analogy also includes other stringed instruments like the violin, cello, etc. that sound equally as bad when first played by novices.

Alternatively, wind instruments typically require a vibrating column of air within the instrument and use holes in the airway or changes in the length of the airway to create a note. Wind instruments such as a flute or clarinet use holes where a trumpet or trombone uses the airway length. In order to set the column of air vibrating, a reed is used or alternatively, buzzing into the instrument is required. Different sounds can be created by changing the way the performer blows into the instrument. It requires great skill for the user to properly get and keep the air column vibrating. If not done correctly the sound output is again less than pleasant to the ear. Traditional wind instruments are very difficult to learn and master.

There are many reasons people don't learn how to play a musical instrument. Among the reasons is the perception that musical ability is innate, you are born with talent for playing or not. Another reason for not learning to play an instrument is the lack of immediate feedback. Playing traditional instruments requires skills that until mastered don't provide rewarding musical sounds early enough in practice. Finally, practice is required and practicing alone can be boring to many.

Simpler musical opportunities like karaoke can be fun, include groups of friends, and you don't have to be a good singer to enjoy the experience. In karaoke, the words to sing are displayed on a screen with a pointer to tell the user when to sing them.

An electronic musical instrument which simulates the realistic music experience of traditional musical instruments without the fine tuning of one's skills is desirable.

Another challenging aspect of musically playing an instrument is the ability to read sheet music. Sheet music is used as a record of, a guide to, or a means to perform, a piece of music. Comprehending sheet music requires a special form of literacy: the ability to read musical notation. Some musicians do learn music by ear, where they hear the tune and can play it back without assistance of sheet music. Alternatives to sheet music include chord charts. A chord chart contains little or no melodic information at all but provides detailed harmonic and rhythmic information.

Standard music notation uses a five-line staff. Pitch is shown by placement of notes on the staff and duration is shown with different note values and additional symbols such as dots and ties. Notation is read from left to right. A staff of written music generally begins with a clef, which indicates the particular range of pitches encompassed by the staff. Following the clef, the key signature on a staff indicates the key of the piece by specifying certain notes to be flat or sharp throughout the piece. Following the key signature is the time signature. Measures (bars) divide the piece into regular groupings of beats, and the time signatures specify those groupings. Directions to the player regarding matters such as tempo and dynamics are added above or below the staff.

An alternative method to the standard sheet music and chord charts is desirable.

Guitar Hero™ and Rock Band™ are two popular music video game titles, having sold some 20+ million units by August 2008. Each games feature a guitar-shaped controller that the player uses to simulate the performance of their favorite rock performers. The guitar controller has different colored buttons on the neck and a strum bar on the main body which simulate the frets and strings of a real guitar, respectfully. The player presses buttons and strums on the controller in time with the musical "score" that scroll on the game screen. This guitar-shaped controller is very easy to use to recreate the music presented in the game. The Guitar Hero and Rock Band approach to creating a realistic music experience of traditional musical instruments without the fine tuning of a user's skills is very popular.

A new simplified instrument paradigm beyond gaming is desired; accordingly this invention provides such technology.

DESCRIPTION OF PRIOR ART

The prior art can be described in four basic categories.
1) Use of a video game musical instrument controller tied to a video game console to reproduce the "musical score" and win points. This prior art requires a video game musical instrument controller, video game console and a presentation screen. The video games Guitar Hero and Rock Band exemplify this approach. Example for this prior art are U.S. Patents filed by Harmonix Music System inventors Eran Egozy, Eric Brosius, Daniel Schmidt and Gregory Lo Piccolo, including U.S. Pat. Nos. 5,670,729; 7,459,624 and 7,320,643. The invention presented here is stand alone and does not require a game console or presentation screen.
2) Use of a video game musical instrument controller which must be connected to a general purpose computer and a presentation screen to create a musical performance. "THE ZERO GUIDE was written to help anyone [with a computer] turn their Guitar Hero controller into a musical instrument." Other example prior art involving a general purpose computer and presentation screen are U.S. Pat. Nos. 5,627,335; 5,763,804 and 6,011,212. The invention presented herein is stand alone and does not require a general purpose computer or presentation screen.

3) A traditional instrument controller connected to a synthesizer connected to a sound reproduction system which retains all of the features of the acoustic instrument allowing nuanced control of musical notes through control of the instruments features. For example, a guitar string can be modulated by slightly bending the string over the fret using a finger U.S. Pat. Nos. 6,005,181 and 6,388,183 are example of this prior art.

The significant difference between the '183 instrument and the invention describe herein is the use of a physical controller with buttons, switches, etc. In the '183 instrument, hand gestures in air with input signal devices create the signals for the synthesizer to create music. The invention presented herein uses a physical controller, not hand gestures.

The significant difference between the '181 instrument and the invention described here is the amount of control of the synthesizer available. In the '181 instrument, the user can control every nuance a real instrument has using a physical model synthesizer. In the invention presented herein, the control is limited to just a few buttons and switches, making the instrument much easier to learn and master, while limiting some creativity of sounds control.

OBJECT OF THE INVENTION

It is the primary object of the present invention to provide an electronic musical instrument which allows non-musicians to create and/or control musical notes and/or musical combinations of notes (known as chords) without the skills required to play a plethora of acoustic, electric or electronic musical instruments, including string, wind, and percussion instruments.

It is a further object of the present invention to provide an electronic musical instrument which allows the unskilled user to utilize far fewer controls than is required in the analogous traditional musical instrument. In a guitar example, proper placement and pressure of a finger over a string on a fret is required to create a note. In a wind instrument, proper vibration of a column of air combined with opening and closing valves on the instrument are required to create a note. Instead, with this invention, the user presses a button to create a note or chord in combination with toggling a switch, to simulate strumming a string or strings.

A more general object of the present invention is to provide an electronic musical instrument which is easy to master without extensive training and practice, providing inexperienced users with the pleasure of creating music and which is comfortable to handle and play.

Another primary object of the present invention is to provide a new means to present the musical notes or chords to be played. The new musical sheet music replaces the standard musical notation with simple color coded dots and elongated dots (to denote holding the note) and instructions on setting up the instrument's controls. For a basic three chord rock tune, the new sheet music tells the player to set the instrument up so the three chords of interest are assigned to three controls on the instrument. The player then presses the appropriate control when the sheet music says to.

In general, in one aspect, the invention features an electronic musical instrument having a simple user input controller, a means to translate the inputs to appropriate signals to trigger a musical synthesizer, and an output allowing the creation of music. In the present invention a guitar-shaped video game controller using buttons, controls, and switches, triggers notes and/or cords in a guitar synthesizer which is suitably amplified and transformed into sounds as reproductions of the sounds produced by a standard guitar, electric, acoustic, bass or similar.

Still another object of this invention is to provide a musical instrument of the character mentioned which provides a simplified means to create string instrument sounds and music using a string instrument-like physical controller inputs rather than the normal fingers on strings and frets and strumming or plucking such strings to create sounds.

Still another object of this invention is to provide a musical instrument of the character mentioned which provides a simplified means to create wind instrument sounds and music using a wind instrument-like physical controller which does not rely on the user properly vibrating a column of air within the instrument to create music, rather the user only pressing appropriate buttons on the instrument to create the instrument notes. Alternatively, the user may blow into the physical controller to adjust the output volume or other natural acoustic instrument variation via a pressure sensitive controller.

Another object of this invention is to provide a musical instrument of the character mentioned created by combining a physical controller which is not primarily for use in a video game, a musical instrument synthesizer, and a sound reproduction system. A non-game physical controller would not be compatible with game consoles.

A still other object of this invention is to provide a musical instrument of the character mentioned which provides a simplified means to create musical instrument sounds and music using standard video game controller inputs. For example, a user could use the buttons on a standard video game controller to trigger musical instrument sounds when used as the input for this invention. Of course, the game controller would have no analogous relationship to traditional instruments.

Another implementation would include an integrated synthesizer, amplifier and loudspeaker.

Another implementation would add a foot pedal or other switch to modify the mapping presets in the invention allowing switching to another set of controls.

Another implementation would add an analog effect, such as a standard guitar fuzz box, to the above instrument allowing additional control of the sounds produced.

Another implementation would add a digital storage device internally (such as a hard disk drive or flash memory) and playback, record and editing controls to the above instrument allowing the user to record, playback and edit musical creations.

Another implementation would add an Ethernet jack to the above instrument allowing the user to record, edit and playback musical creations from an external computing device.

This application describes the system and method such that the device can be used as a practical amateur or professional musical instrument.

The purpose of this invention is to enable any controller to become a standalone musical instrument by plugging the controller into a musical synthesizer and amplifier/loudspeaker system.

It is another purpose of this invention is to generate an interest in music and show that there is a new world of creativity available to all users, which is purely reactive, to one of personal creativity and education.

These and other purposes of the spirit and claims of the invention will be known to anyone skilled in the art.

SUMMARY OF THE INVENTION

| DRAWINGS - REFERENCE NUMERALS | |
|---|---|
| 100 | system |
| 102 | user input controller |
| 104 | translation device |
| 106 | sound generator |
| 108 | amplifier |
| 110 | loudspeaker |
| 112 | display |
| 114 | non-volatile memory |
| 116 | record, playback, edit controls |
| 118 | secondary external controls |
| 120 | audio effects sources (signal loop) |
| 302 | controller input jack |
| 304 | volume control |
| 306 | settings dial |
| 308 | audio output jack |
| 310 | headphone output jack |
| 600 | simplified music notation sheet |
| 602 | color-coded notes/chords |
| 604 | single note/chord |

DETAILED DESCRIPTION OF THE INVENTION

The invention described, a simplified controller in conjunction with an instrument synthesizer creates a new, easy to master electronic musical instrument allowing users to perform live music without the need of a video game or computer in three ways:

1) After mastering and memorizing a song, using the controller connected to a synthesizer, the song can be played without the years of practice required by traditional guitars.
2) Additionally, a user could recreate known musical compositions by ear and/or create original musical compositions.
3) Additionally, a user could play a musical composition following a simplified score or "sheet music", similar to chord books written for guitarists.

In summary, this invention provides an electronic musical instrument which may be used to create a musical performance from a simplified physical controller, controlling an electronic synthesizer. The physical controller generally includes an instrument body, and at least one sensor element carried by the controller body. The sensor element generates user input signals upon mechanical actuation of the sensor element by the user, e.g., pressing a button or flipping a switch. The user input signals are transmitted to a processor which receives the user input signals and controls the acoustic output in response to the user input signals.

The invention is also directed towards a synthesis system and a sound processing system each incorporating the control instrument. The music synthesis system includes a processor coupled to the sensor element for receiving the music synthesis signals and generating audible output signals in response to the music synthesis signals, and at least one audio loudspeaker coupled to the synthesizer for converting the audio frequency output signal into audible music. The sound processing system includes a processor coupled to the sensor element for receiving the user input signals and producing control signals, and a signal processor coupled to the processor for receiving the input from the control signals and generating audible output signals in response to the control signals.

As stated above in the objectives, the present invention features an electronic musical instrument having a simple user input controller, a means to translate the inputs to appropriate signals to trigger a musical synthesizer, and an output allowing the creation of music.

Figure 1:
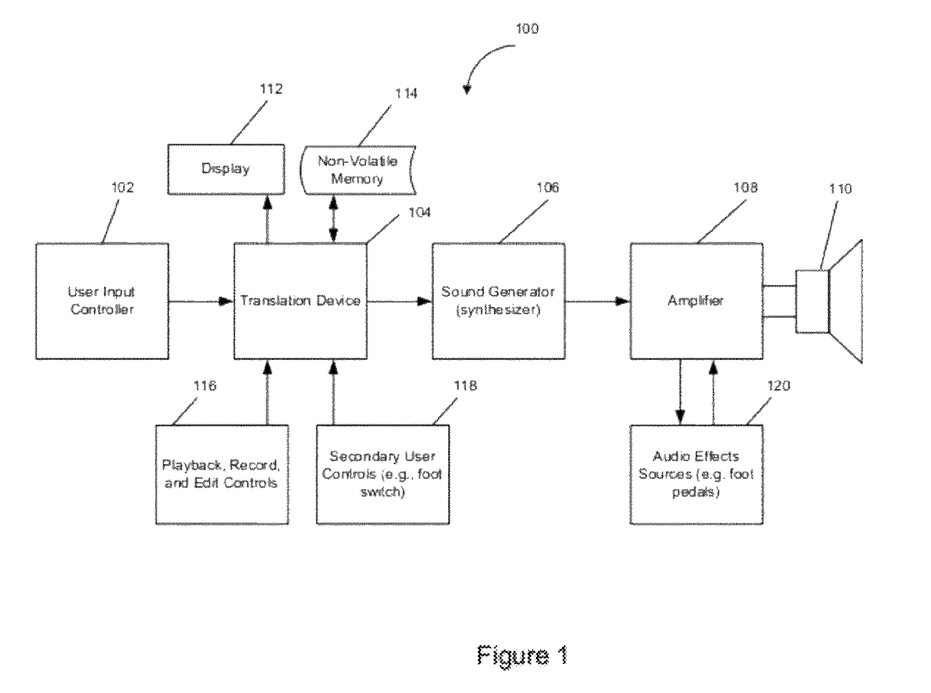
FIG. 1 is a block diagram depiction of the preferred embodiment of the instrument.

Referring to FIG. 1, a system 100 according to the invention, generates music in real-time in response to a user's manipulation of one or more user input controllers ("Controller") 102.

The system 100 includes one or more Controllers 102, a signal Translation Device 104, a Sound Generator 106, an Amplifier 108, one or more acoustic transducers ("Loudspeakers") 110. The system 100 may also include an optional Display 112. The systems 100 may also include optional Non-volatile Memory 114 to save user settings. The systems 100 may also include optional Non-volatile Memory 114 to record either the Sound Generator 106 input signals or the digital audio output of the Sound Generator 106. The system 100 may also include Secondary User Controls 120 such as a foot switch which could be used to switch between user settings. The system 100 may also include Playback, Record and Editing Controls 116 to manipulate content stored in the optional Non-volatile Memory 114. The system 100 may also include an analog signal loop for external Audio Effects Sources 120 such as a multitude of foot pedal devices. The Display 112, Non-volatile Memory 114, Playback, Record and Editing Controls 116, Secondary User Controls 118, and the Analog Effect Sources 120 are all optional features of the invention 100 and are not required.

The Translation Device 104 allows assignment of a Controller 102 button or switch output to a musical note or chord signal to be created by the Sound Generator 106. The system 100 may also include a Display 112 to aid the user in setting up the signal mapping of the Translation Device 104. The system 100 may include Secondary User Controls 118 such as a foot switch to switch between preset signal mappings stored in the signal Translation Device 104.

The musical note or chord signals are sent to the Sound Generator 106, typically a music synthesizer, which generates the audio output. The audio output is sent the Amplifier 108 and then to the Loudspeakers 110 to create the audible music.

The user plays the instrument by manually actuating (pressing a button, twisting a knob, or flipping a switch, for example) the Controller 102 buttons, knobs, switches, or the like in the desired manner. In the preferred embodiment of the invention, the control of the sound generated by the music synthesizer is kept to a minimum, such as note-on, note-off, and note identification, allowing the creation of music very easily. Additional user controls could allow simple pitch changes via a "note bender" control that is commonly known as a whammy bar.

In an additional embodiment of the invention 100, a standard multi-button video game controller could be used as the Controller 102.

In an additional embodiment of the invention 100, a new physical controller design could be used as the Controller 102, either representing a traditional instrument or something completely different that doesn't emulate a traditional instrument.

In another embodiment of the invention 100, the Display 112 would be included.

In yet another embodiment of the invention 100, the Translation Device 104, Display 112, Non-volatile Memory 114, Sound Generator 106, Amplifier 108, and one or more Loudspeakers 110 would be bundled together in a single unit.

The primary object of the present invention to provide an electronic musical instrument which allows non-musicians to create and/or control musical notes and/or musical combinations of notes (known as a chord) without the skills required to play a plethora of acoustic, electric or electronic musical instruments, including string, wind, and percussion instruments.

It is a further object of the present invention to provide an electronic musical instrument which allows the unskilled user to utilize far fewer controls than is required in the analogous traditional musical instrument. In a guitar example, proper placement and pressure of a finger over a string on a fret is required to create a note. In a wind instrument, proper vibration of a column of air combined with opening and closing valves on the instrument are required to create a note. Instead, with this invention, the user presses a button to create a note or chord in combination with toggling a switch, to simulate strumming a string or strings.

A more general object of the present invention is to provide an electronic musical instrument which is easy to master without extensive training and practice, providing inexperienced users with the pleasure of creating music and which is comfortable to handle and play.

Figure 2:
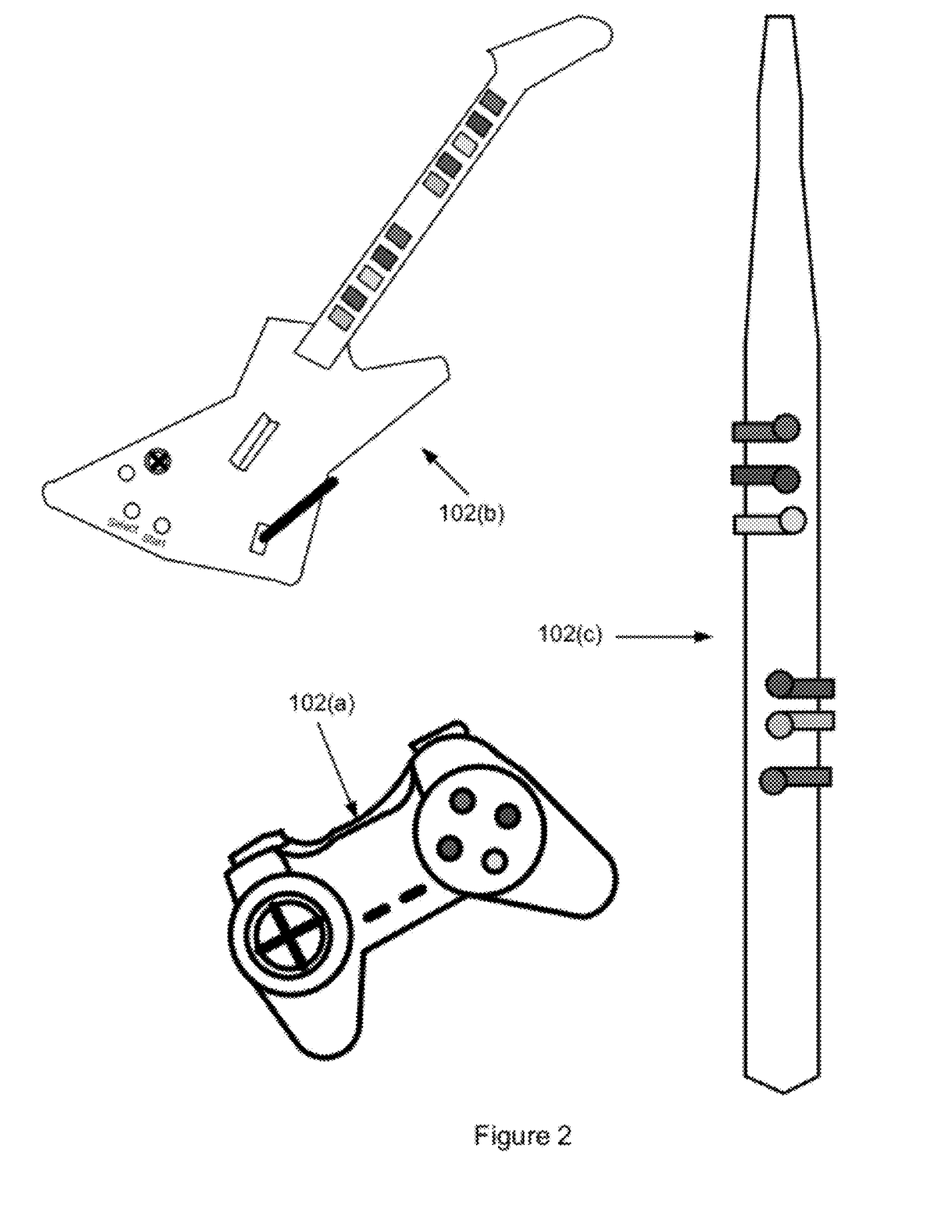
FIG. 2 is a depiction of three possible controllers.

Referring now to FIG. 2, we see three variations of potential Controllers 102. One version is a standard video game controller 102(*a*), another is a virtual guitar game controller 102(*b*) and the third is a virtual wind instrument controller 102(*c*). As can be seen, the shape, size, and other physical characteristics are unimportant. The important features are the buttons, switches and other controls that provide a digital control signal to the Translation Device 104 in other figures. The buttons can be color coded to provide the user with easy reference to which button should be pressed when according to the song or Simplified Sheet Music 600, shown in FIG. 6.

Figure 3:
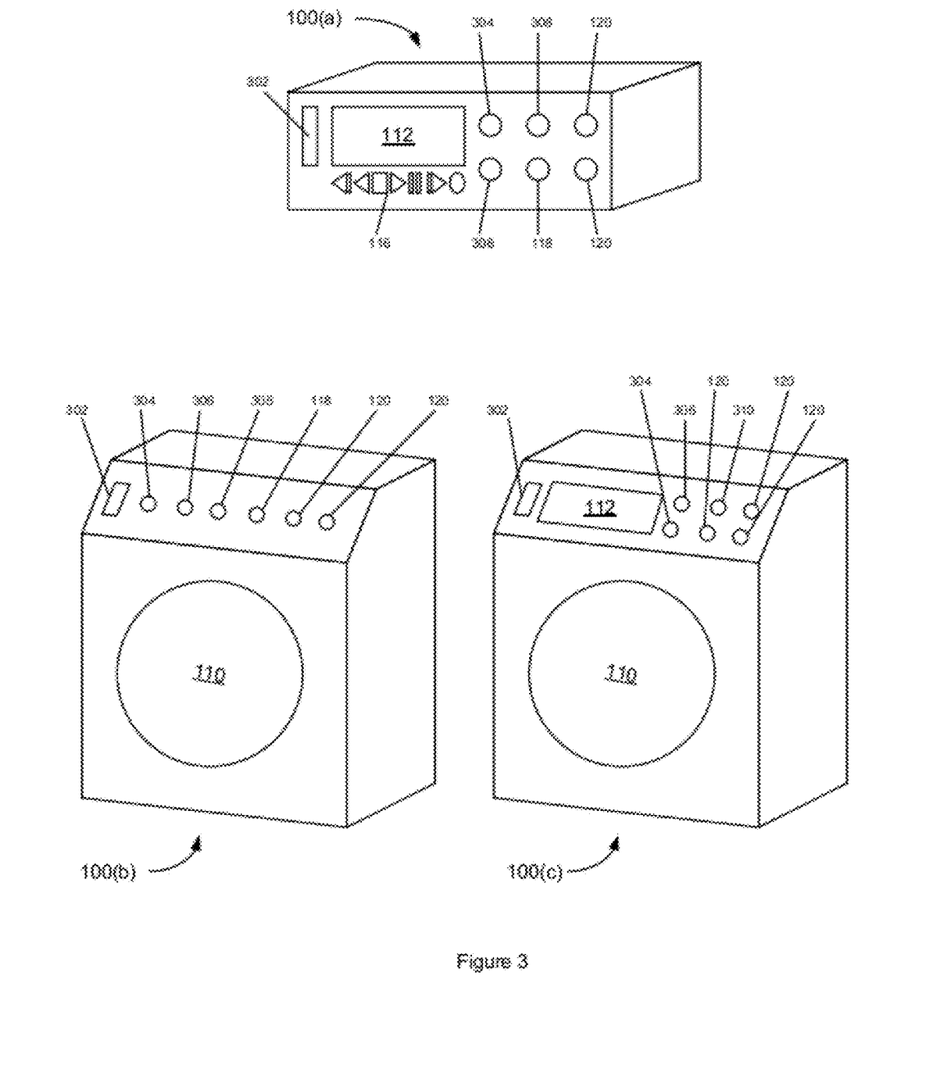
FIG. 3 is a depiction of three possible embodiments of the instrument.

In FIG. 3, we see the preferred embodiment 100(*a*), requiring an external Amplifier 108 and Loudspeaker 110. Another embodiment 100(*b*) includes an integrated Amplifier 108 and Loudspeaker 110. Another embodiment 100(*c*) includes an integrated Amplifier 108, Loudspeaker 110 and Display 112.

Each of the embodiments 100(*a*), 100(*b*) and 100(*c*) requires a Controller 102 which is connected to a Controller Input Jack 302 which then provides the digital control signals to create music in the Sound Generator 106, internal to the embodiments. Each of these embodiments 100(*a*), 100(*b*) and 100(*c*) may also include the various other features, such as Volume Control 304; a Settings Dial 306; an Analog Output Jack 308 for use with an external Amplifier 108 and Loudspeaker 110; a Headphone Output Jack 310 for personal listening; Secondary External Controls 118; and/or an Audio Effects Sources 120 loop. Additionally, though not shown in the these drawings, could be an Ethernet Jack for connection to a computer network for retrieving and/or editing saved content from Non-Volatile Memory 114.

Figure 4:
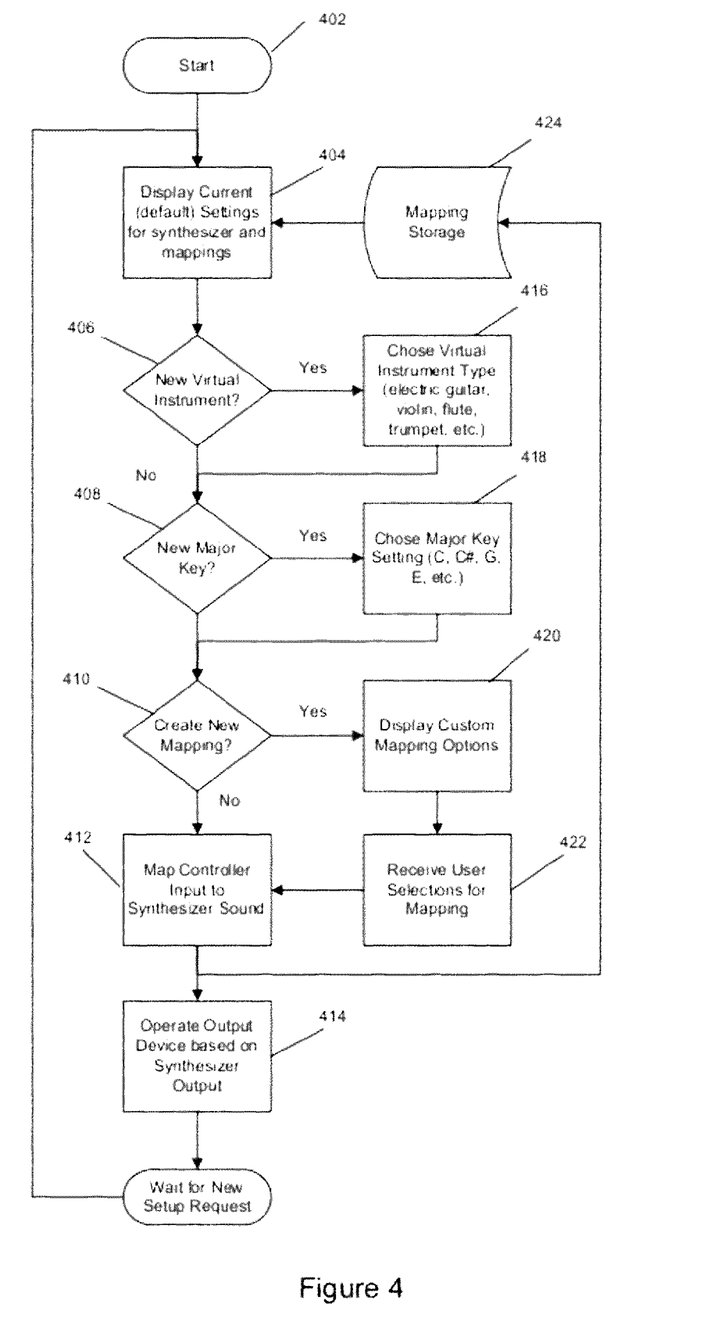
FIG. 4 is a flow diagram illustrating one embodiment of a method for facilitating interaction of a user with a controller during setup.

Referring now to FIG. 4, a flow diagram illustrating one embodiment of a method for facilitating interaction of a user with a Controller 102 during setup is described. In a brief overview, the method comprises: initiate by powering up the system 100 (step 402); displaying the default or current synthesizer and mapping settings (step 404); provide an option to select a new virtual instrument sound set, e.g. bass guitar, violin, flute, etc. (step 406); provide an option to chose the Major key for the sound set, C, C#, G, E, etc. (step 408); providing an option to create a new Controller 102 input to note or chord mapping (step 410); map controller inputs to synthesizer inputs (step 412); and then operating output device based on synthesizer output in running mode (step 414). If the user decides to choose a new virtual instrument sounds set step 416 would be engaged. If the user decides to choose a new Major Key for the sound set step 418 would be engaged. If the user decides to remap input controller signals to different note or chord signals step 420 would be engaged. In this case, the display would provide custom mapping options (translating Controller 102 output signals to synthesizer input signals) step 420 that allow the user to make changes to the signal mapping (step 422) using a combination of buttons or switches on the Controller 102. If any changes are made during setup, the new instrument setting, Major Key and mappings are saved in non-volatile memory mapping storage 424.

For an example of the preferred embodiment, using a guitar game controller as the Controller 102(*b*), the system 100 could use the Display 112 to show that pushing a button will play a specific guitar note or chord, either by itself or by a combination of pushing the button and strumming the strum bar. The signal Translation Device 104 may be modified by using the method described in FIG. 4 to change the note or chord generated by the system 100 when a specific button is pressed.

Figure 5:
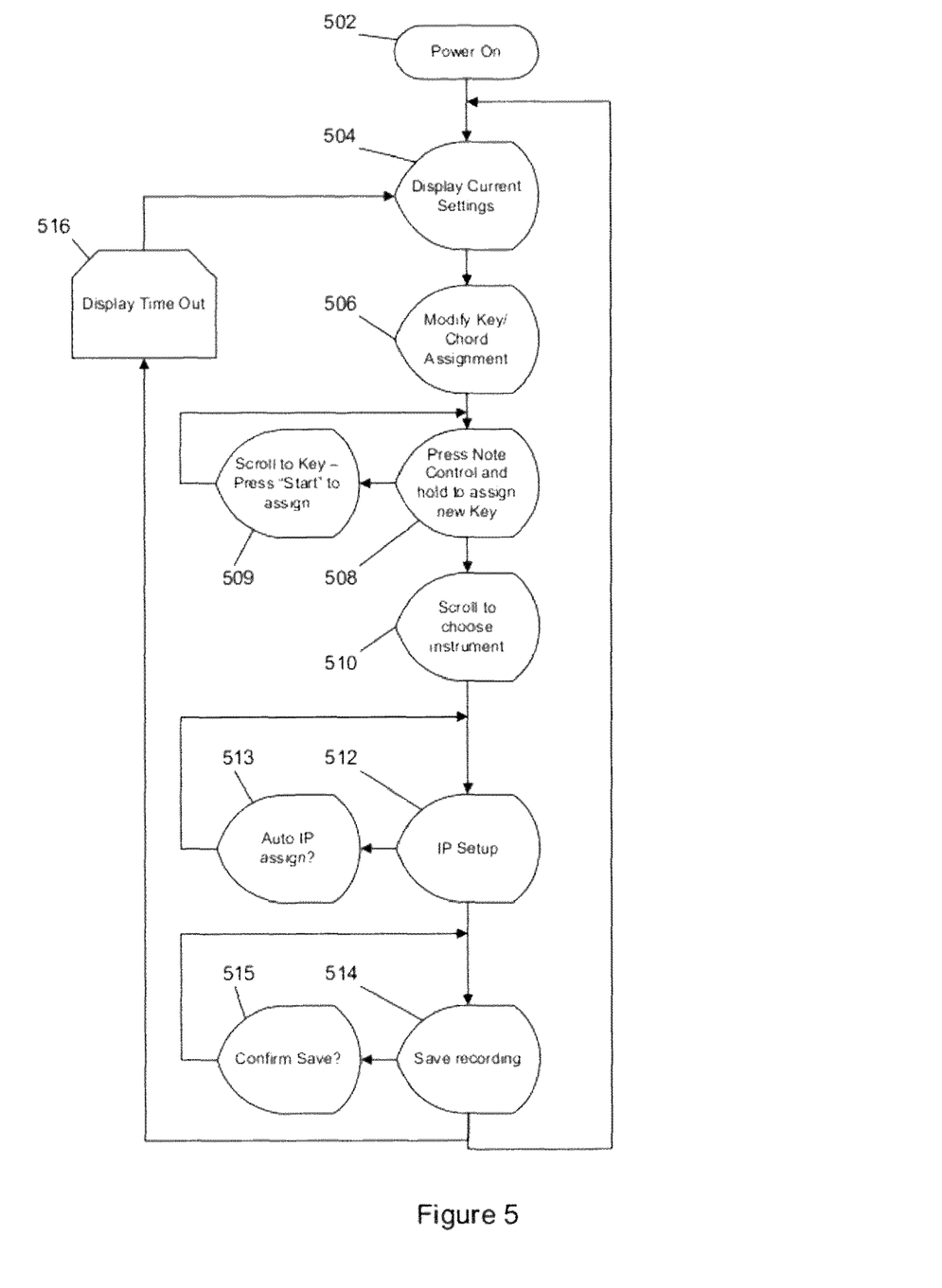
FIG. 5 is a flow diagram illustrating an alternative embodiment of a method for programming the instrument.

In FIG. 5, a flow diagram illustrating an alternative embodiment of a method for facilitating interaction of a user with an embodiment of the system 100 is described. In a brief overview, the method comprises: initiate by powering up the system 100 (step 502); displaying the default or current input to note or chord mapping (step 504); providing an option to create a new Controller 102 input to note or chord mapping (step 506) as detailed in FIG. 4; map controller inputs to synthesizer inputs (step 508); chose an instrument to simulate (step 510); optionally setup networking such as IP address (step 512); and finally save or edit a recording (step 514). After some delay, the display will time out and return to displaying the default or current settings (step 516). If a user continues to scroll past step 514, the system will return to step 504 and continue scrolling through the available options again.

Again, as an example of the preferred embodiment, using a guitar game controller as the Controller 102(*b*), the system 100 may use a Display 112 to show that pushing a button on the Controller 102(*b*) will play a specific note or chord, either by itself or by a combination of pushing the button and strumming the strum bar. The signal Translation Device 104 may be modified by using the method described in FIG. 5 to change the note or chord generated by the system 100 when a specific button on the Controller 102(*b*), is pressed.

Figure 6:
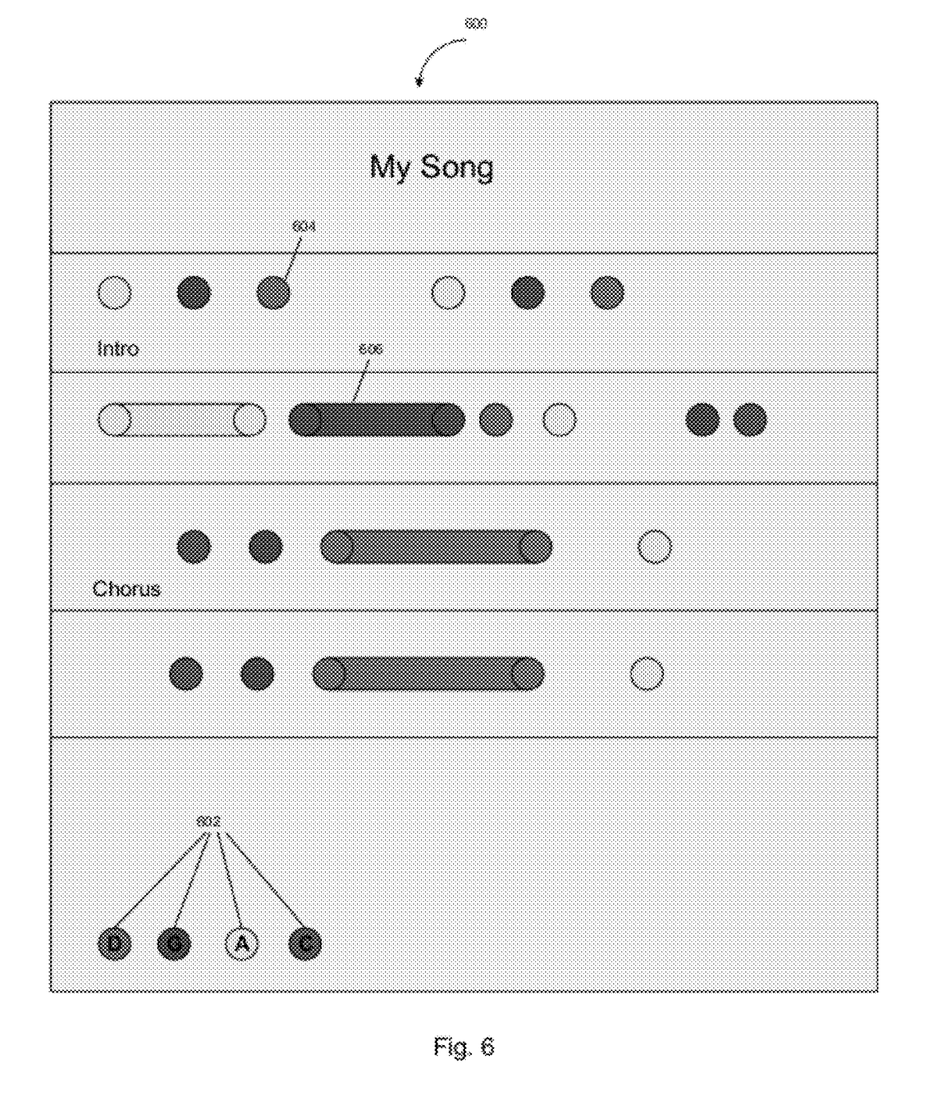
FIG. 6 is a depiction of a possible embodiment of a simplified sheet music.

FIG. 6 is a depiction of a possible embodiment of a new chord chart or sheet music 600. The notes and/or chords are color coded 602 and presented for the user to set up the system 100. The order of playing the notes and/or chords is also presented. When the musical piece requires the user to play a note and/or chord and release it, it is depicted as a single color coded circle or dot 604. When the musical piece requires the user to play a note and/or chord and hold it for some time before releasing, it is depicted as an extended color coded circle or dot 606.

The example shown in FIG. 6 is the most basic and requires the user to have some familiarity with the song. Familiarity with the song is required because there is no timing information present. This is similar to a chord chart used by Jazz musicians. To expand the notation presented, vertical lines could be added to represent timing. For example, in a musical work with four beats per measure, there could be vertical lines to represent each measure, similar to existing musical notation.

What is claimed:

1. An electronic music system, comprising:
   a first input jack adapted to receive input signals from an external controller corresponding to the actuation of one or more controller switches;
   a translation device, coupled to the first input jack, for programmably assigning input signals received at the input jack to musical note signals; and
   a sound generator, coupled to the translation device, for generating audio output signals responsive to the musical note signals;
   wherein the translation device is programmed to execute a setup routine comprising:
      receiving a user input to select a virtual instrument sound set;
      receiving a user input to select a key for the virtual instrument sound set;
      receiving a user input to associate controller switches to selected musical notes in the selected key;
      responsive to the user inputs, mapping the input signals corresponding to the actuation of one or more controller switches to musical note signals for the selected musical notes in the selected key for the selected virtual instrument sound set.

2. The system of claim 1, wherein the translation device is coupled to a display;
   and wherein the setup routine for which the translation devices is programmed further comprises:
      displaying, at the display, current mapping settings of the translation device.

3. The system of claim 2, further comprising:
   a housing, containing the input jack, translation device, and sound generator;
   an output jack, disposed at the housing, adapted to connect an output of the sound generator to an external amplifier.

4. The system of claim 2, further comprising:
   an amplifier, coupled to the sound generator; and
   a housing, containing the first input jack, translation device, sound generator, and amplifier.

5. The system of claim 4, further comprising:
   a loudspeaker, disposed within the housing.

6. The system of claim 1, further comprising:
   a memory; and
   playback, record, and editing controls, coupled to the translation device;
   wherein the translation device is also for storing sequences of the musical note signals in the memory, and for manipulating those stored sequences, responsive to inputs received at the playback, record, and editing controls.

7. The system of claim 6, further comprising:
   an Ethernet jack adapted to couple the memory to an external network.

8. The system of claim 1, further comprising:
   a second input jack adapted to receive input signals from a secondary user control;
   wherein the translation device is also coupled to the first input jack, and switches among stored mappings responsive to input signals from the second input jack.

9. A method of generating music from a controller, comprising the steps of:
   receiving a user input to select a virtual instrument sound set;
   receiving a user input to select a key for the virtual instrument sound set;
   receiving a user input to associate controller switches to selected musical notes in the selected key;
   mapping input signals corresponding to the actuation of one or more controller switches to musical note signals for the selected musical notes in the selected key for the selected virtual instrument sound set to create a first mapping;
   storing the first mapping in a memory;
   connecting a controller to a first input jack;
   responsive to receiving input signals corresponding to the actuation of one or more controller switches of the controller, generating musical note signals corresponding to the first mapping;
   synthesizing audio output signals responsive to the generated musical note signals;
   amplifying the audio output signals to generate audio output from a loudspeaker.

10. The method of claim 9, further comprising:
    displaying current mapping settings at a visual display.

11. The method of claim 9, further comprising:
    responsive to receiving an input signal corresponding to the actuation of one or more controller switches, displaying, at a visual display, an indication of a musical note corresponding to those one or more controller switches according to the first mapping.

12. The method of claim 9, further comprising:
    receiving input signals from a secondary user control connected to a second input jack;
    selecting among a plurality of mappings stored in the memory, responsive to the received input signals from the secondary user control.

13. The method of claim 9, further comprising:
    storing, in the memory, sequences of received input signals corresponding to the actuation of one or more controller switches of the controller.

14. The method of claim 9, further comprising:
    storing, in the memory, audio output signals resulting from the synthesizing step.

15. The method of claim 9, wherein the mapping step comprises:
    mapping input signals corresponding to the actuation of a single controller switch to musical note signals for a plurality of musical notes in the selected key, so that the first mapping corresponds to a chord in the selected key.

16. The system of claim 1, wherein the mapping in the setup routine that the translation device is programmed to execute comprises:
    mapping the input signals corresponding to the actuation of a single controller switch to a plurality of musical note signals in the selected key for the selected virtual instrument sound set, so that the first mapping corresponds to a chord in the selected key.

* * * * *